Patented Dec. 5, 1933

1,937,969

UNITED STATES PATENT OFFICE 1,937,969

EMULSIFIER AND INSECTICIDE

Hugh Knight, La Verne, Calif., assignor, by direct and mesne assignments, to Emulsoids, Inc., New York, N. Y., a corporation of Delaware No Drawing. Application October 28, 1929
Serial No. 403,128

17 Claims. (Cl. 167—22)

My invention relates to a medium, agent or compound usable in rendering an oil capable of mixing with water to form an emulsion and it also relates to a medium, agent or compound possessing an insecticidal value, the prime objects of the invention being to provide an agent or compound of this nature which is completely soluble in oil and which will produce an emulsion satisfactory for all purposes and of a stability required.

Most of the emulsifying agents known and used at present in the various arts are immiscible in oil, or if miscible they are so only under certain conditions but they are not soluble in oil. Complete solubility of an emulsifying agent in oil is of considerable advantage, especially where oil is or acts as diluent for insecticidal compounds or fluids.

The characteristic of solubility in oil of an emulsifier makes it possible to dispense with the usual stock emulsions, which are prepared emulsions and which are required to be diluted with water for use as a spray for insect extermination, and importantly makes it possible to prepare an emulsifiable body or fluid which may be kept indefinitely without danger of deterioration. To produce an emulsion from an oil containing an oil soluble emulsifier, it is only necessary to add same in needed or desired proportions to water and to agitate the mixture.

I have discovered that certain derivatives of the fatty acids are admirably adapted as an intervening medium for producing an uniform emulsion and that this is especially true of the esters. Of the various esters of the fatty acids that are usable in the emulsification of oils, I have found the butyl-acetyl-ester of ricinoleic acid or butyl-acetyl-ricinoleate to give most satisfactory results, first because it is possessed of extraordinary emulsifying powers, second, because it is completely soluble in a petroleum hydrocarbon, and third, because I have found this ester to have marked insecticidal properties, even when used in dilution with water.

Emulsions may be made with this compound in the conventional manner, that is, by first mixing the emulsifying agent with water and then while vigorously agitating the mixture, adding the required amount of mineral, animal or vegetable oil. This ester, it will be observed, is active either in water or in oil, that is, it can be mixed with water or it can be dissolved directly in the oil.

The amount of the emulsifying agent used will depend entirely upon the degree of stability required in the emulsion, and also upon the type of oil to be emulsified, the less viscous oils requiring more than the more viscous oils. Generally, however, for use against the scale insects of citrus, I have found that from 1 to 3 per cent, of the emulsifier is sufficient.

Butyl-acetyl-ricinoleate, in addition to its emulsifying powers, I have found possesses insecticidal value of considerable strength where used alone. For instance, I have found it effective against aphis and plant lice at a concentration of 1% to 2% in water and against the armored scales of citrus at higher concentrations.

When used alone, however, dissolved in water it should be agitated vigorously and agitation should continue during application.

What I claim, is:

1. As an emulsifier insecticide, an oil soluble butyl-acetyl-ester of a fatty acid.
2. As emulsifier insecticides, the acylated esters of hydroxy fatty acids of castor oil.
3. As emulsifier insecticides, the acylated alkyl esters of hydroxy fatty acid esters of castor oil.
4. As emulsifier insecticides, the acylated esters of ricinoleic acid.
5. As emulsifier insecticides, the acylated alkyl esters of ricinoleic acid.
6. As emulsifier insecticides, the acetylated butyl esters of fatty acids of castor oil.
7. An insecticidal composition containing acylated esters of hydroxy fatty acids of castor oil.
8. An insecticidal composition containing acylated alkyl esters of hydroxy fatty acid esters of castor oil.
9. An insecticidal composition containing acylated esters of ricinoleic acid.
10. An insecticidal composition containing acylated alkyl esters of ricinoleic acid.
11. An insecticidal composition containing acetylated butyl esters of fatty acids of castor oil.
12. An insecticidal composition comprising butyl acetyl ricinoleate.
13. An insecticidal composition comprising butyl acetyl ricinoleate and water.
14. An insecticidal composition comprising butyl acetyl ricinoleate, water, and a material selected from the group consisting of mineral oils, animal oils, or vegetable oils.

15. An insecticidal composition comprising acylated esters of ricinoleic acid, water, and a material selected from the group consisting of mineral oils, animal oils, or vegetable oils.

16. An insecticidal composition comprising an acylated ester of a fatty acid of castor oil, water, and a material selected from the group consisting of mineral oils, animal oils, or vegetable oils.

17. An insecticidal composition comprising an oil soluble butyl-acetyl-ester of a fatty acid.

HUGH KNIGHT.